RETRACTABLE ROLLER DEVICE

Filed Sept. [illegible], 1955

Inventors
Raymond Curtis Millett
John C. H. Binney
By Mann, Brown & Hausmann
attorneys Oct. 13, 1959 R. C. MILLETT ET AL 2,908,031

RETRACTABLE ROLLER DEVICE

Filed Sept. 15, 1955 5 Sheets-Sheet 2

Inventors
Raymond Curtis Millett
John C. H. Binney
By Mann, Brown & Hausmann
Attorneys

RETRACTABLE ROLLER DEVICE

Filed Sept. 15, 1955 5 Sheets-Sheet 3

Inventors
Raymond Curtis Millett
John C. H. Binney
By
Mann, Brown & Hausmann
Attorneys Oct. 13, 1959 R. C. MILLETT ET AL 2,908,031

RETRACTABLE ROLLER DEVICE

Filed Sept. 15, 1955 5 Sheets-Sheet 4

INVENTORS,
Raymond Curtis Millett
John C. H. Binney
By:-
Mann, Brown and Hansmann
Attys.

RETRACTABLE ROLLER DEVICE

Filed Sept. 15, 1955 5 Sheets-Sheet 5

INVENTORS.
Raymond Curtis Millett
John C.H. Binney
By:-
Mann, Brown and Hansmann
Attys.

United States Patent Office 2,908,031
Patented Oct. 13, 1959

2,908,031
RETRACTABLE ROLLER DEVICE

Raymond Curtis Millett and John C. H. Binney, Anaconda, Mont.

Application September 15, 1955, Serial No. 534,437
15 Claims. (Cl. 16—34)

Our invention relates to a retractable roller device, and more particularly, to a device adapted to be secured to the bottom of furniture or the like, adjacent the surface on which same is supported, which device is normally in a retracted, inoperative position, but which may be locked into extended position in which the weight of the furniture or the like may be placed on the roller device and the furniture or the like easily moved to a new location.

Most types of houshold and office furniture and equipment, such as overstuffed chairs, chests, desks, filing cabinets, office machine stands, safes, and the like are relatively heavy, and, when one desires to move such an item, it must be lifted bodily by one or more persons, or placed on a suitable cart or truck. We have found a need for a device which may be secured to any one of the above mentioned items, as well as many more of a similar nature which could be mentioned, that will allow one person to easily move the furniture or equipment without straining, and without requiring the use of a separate truck or cart.

Accordingly, it is a primary object of this invention to provide a roller device adapted to be secured to furniture or the like, which is normally in a retracted inoperative position, but which may be extended or positioned in operative position by merely lifting one side of the article to which it is attached thereby permitting one to readily place the weight of the article on the device and move the article to a new location with a minimum of effort.

A further object of the invention is to provide a roller device for furniture or the like which allows one to move relatively heavy pieces of furniture without strain and without requiring the use of a separate truck or cart.

Still another object of the invention is to provide a retractable roller device which may be applied to, and used with, equal facility to move a wide variety of household, office, and shop furniture and equipment.

Yet another object of the invention is to provide a retractable roller device which may be operated by lifting any one side of the article to which it is attached.

Yet a further object of the invention is to provide a wheeled receptacle provided with a retractable roller device in accordance with the teachings of our invention.

In accordance with several of the illustrated embodiments of the invention, we provide a roller device adapted to be secured to an object or article such as a piece of furniture and the like, comprising a frame adapted to be fixed to the bottom of the object or article and adjacent the supporting surface therefor; two pairs of pivoted links or arms are employed in connection with several of the illustrated embodiments, and in a preferred form one arm of each pair is pivoted to the frame and the other arm of each pair is slidably connected thereto. The pairs of links or arms are disposed in spaced relationship and support therebetween roller means adapted to engage the supporting surface. Releasable latch means are interposed between the slidably connected links or arms and the frame, the arrangement being such that the roller means normally is in inoperative position underneath the furniture or the like, though it is in contact with the supporting surface, and when the object or article is, for instance, tilted to one side, the roller means drops beneath the upraised furniture or the like, and, upon the article being lowered toward the supporting surface, the roller means is locked into extended position, allowing one to tilt the piece of furniture or the like up on the roller means and move it where desired on said roller means. The roller device may be retracted into inoperative position be merely lifting up one side of the piece of furniture or the like to take the weight thereof off the roller means thereby releasing the roller means from locked position, and then merely lowering the article to the supporting surface.

It will be appreciated that the present invention provides substantial advantages over prior practices. For instance, one may move an object or article, such as a piece of furniture or the like, by merely lifting one side of the article sufficiently high to lock the roller means of the device in place, tilt the article up on the roller means, and move the same while the item is supported on said roller means. After the new position of the item is reached, the roller device may be rendered inoperative by merely lifting on one side of the article until the weight thereof is taken off the roller means, thereby unlocking the roller means, and replacing the said side of the article on the supporting surface, the roller device retracting into inoperative position as the article is lowered into the desired position.

Other objects, uses and advantages will be obvious or become apparent from a consideration of the following description and drawings.

Figure 1:
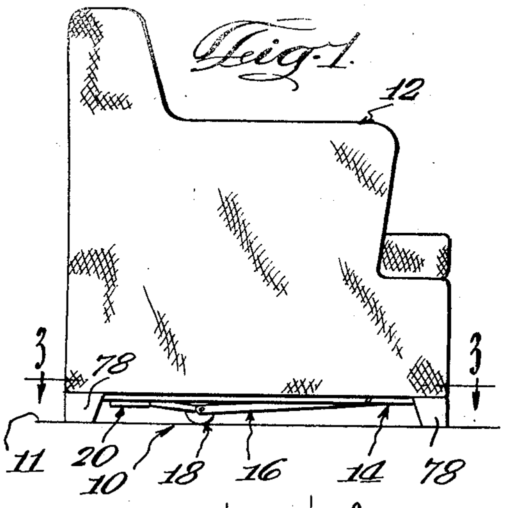
Figure 1 is a diagrammatic side elevational view of an overstuffed chair having the present invention applied thereto, showing the roller means in retracted or inoperative position.

Referring now more particularly to Figures 1–4, reference numeral 10 generally indicates a preferred form of the device applied to, for instance, an overstuffed chair 12 resting on a supporting surface 11. The device 10 as illustrated includes a frame 14, two pairs of pivoted links or arms 16, roller means 18 and releasable latching or locking devices 20.

The flange 14 of the present embodiment comprises a pair of rigid angle bars 22 fixed in spaced relationship by a pair of bars 24 secured thereto by screws 25. The frame may be secured to the bottom of the chair 12 in any suitable manner, as at the ends of the bars 22 by suitable screws, bolts, or the like as diagrammatically indicated at 23.

Each pair of pivoted links or arms 16 comprises a first link or arm 26 pivoted at one end thereof by a pin 28 to a frame bar 22 and a second link or arm 30 pivotally connected to the other end of said link or arm 26. In the present embodiment, rod 32 pivotally connects the arms 26 and 30, and rotatably carries a number of rollers 34. The arms 30 are pivotally connected, respectively, by pins 36, to the releasable latching devices 20.

Figure 5:
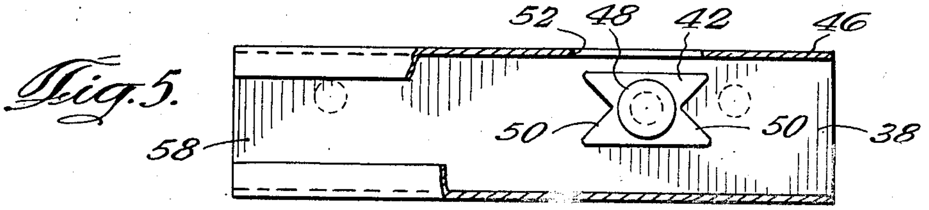
Figure 5 is an elevational view, partially in section, of the outer or larger channel member comprising the releasable latching means employed in our invention.
Figure 6:
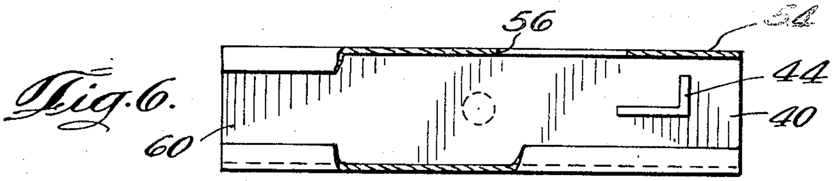
Figure 6 is a view similar to that of Figure 5, illustrating the inner or smaller channel member employed in said latching means.
Figures 7, 8, 9:
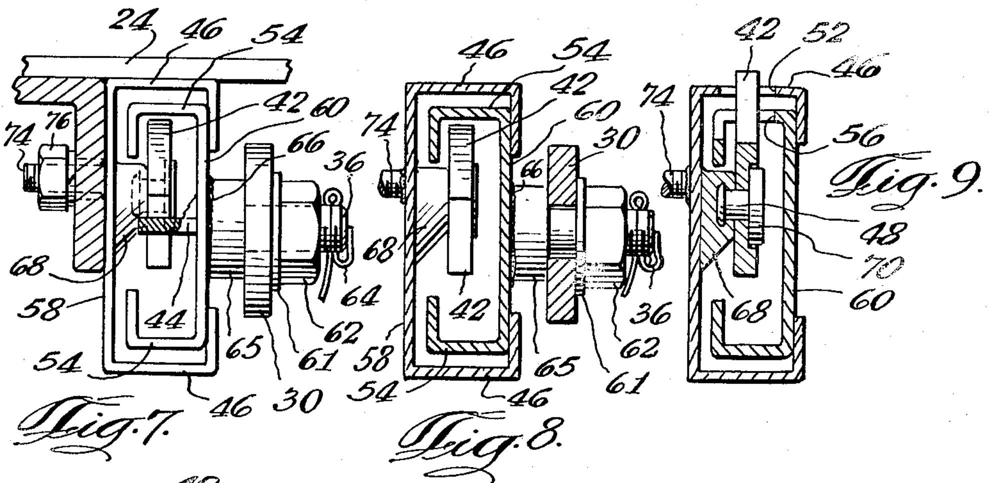
Figure 7 is a sectional view along line 7—7 of Figure 3.
Figure 8 is a sectional view along line 8—8 of Figure 3.
Figure 9 is a sectional view along line 9—9 of Figure 4.

The releasable latching devices 20 each comprise (see Figures 4–9) a larger outer channel member 38, a smaller inner channel member 40 slidably received within the channel member 38, a pawl 42 pivotally carried by the channel member 38, and a lug 44 fixed to the channel member 40. Referring specifically to Figures 5 and 6, the pawl 42 is pivotally secured to the channel member 38 within the sides 46 thereof by a pin 48. The pawl 42 has an oblong configuration, and each of its extremities is formed with a V-shaped recess or notch 50. The upper side 46 of channel member 38, as shown in Figure 5, is formed with an elongate slot 52, positioned with respect to the pawl substantially as shown in Figure 5. The lug 44 is fixed between the sides 54 of the inner channel member 40 by any suitable means, and an elongate slot 56 is formed in the upper side of the channel member 40, said slot 56 being positioned with respect to the lug substantially as shown in Figure 6. As shown in Figures 7–9 and 11–16, the inner channel 40 is positioned within the channel 38 with the open side thereof adjacent the web 58 of the larger channel member, and the lug 44 is positioned to engage the pawl 42 when moved toward it.

Figure 10:
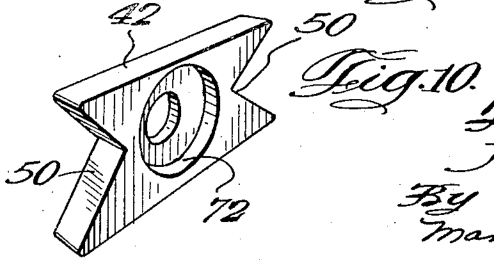
Figure 10 is a perspective view of the pawl employed in the releasable latching means of the invention.

The pins 36 connecting the arms 30 to the releasable latching devices 20 are fixed, respectively, to the webs 60 of the channel members 40, suitable washers 61, nuts 62 and cotter pins 64 being employed to retain the arms or links 30 on the pins, or any other appropriate means serving the same purpose. In the illustrated embodiment, pin 36 is enlarged as at 65 to provide a greater surface for welding material 66 and to space the arms 30 from the bars 22. Pin 48 may be fixed to the web 58 of channel member 38 in any suitable manner, as by welding material 68. In the illustrated embodiment, the pin is provided with a relatively wide, flat head 70 which is positioned within the recess 72 formed in the pawl 42 (see Figure 10); this arrangement effectively restrains undesirable lateral movement of the pawl 42. Channel members 38 may be fixed to the respective bars 22 in any suitable manner, such as by pins 74 (only one is shown, but it is contemplated that at least two for each member 38 would be used) welded to the channel members and secured to the bars 22 by nuts 76 (see Figure 7).

Figure 3:
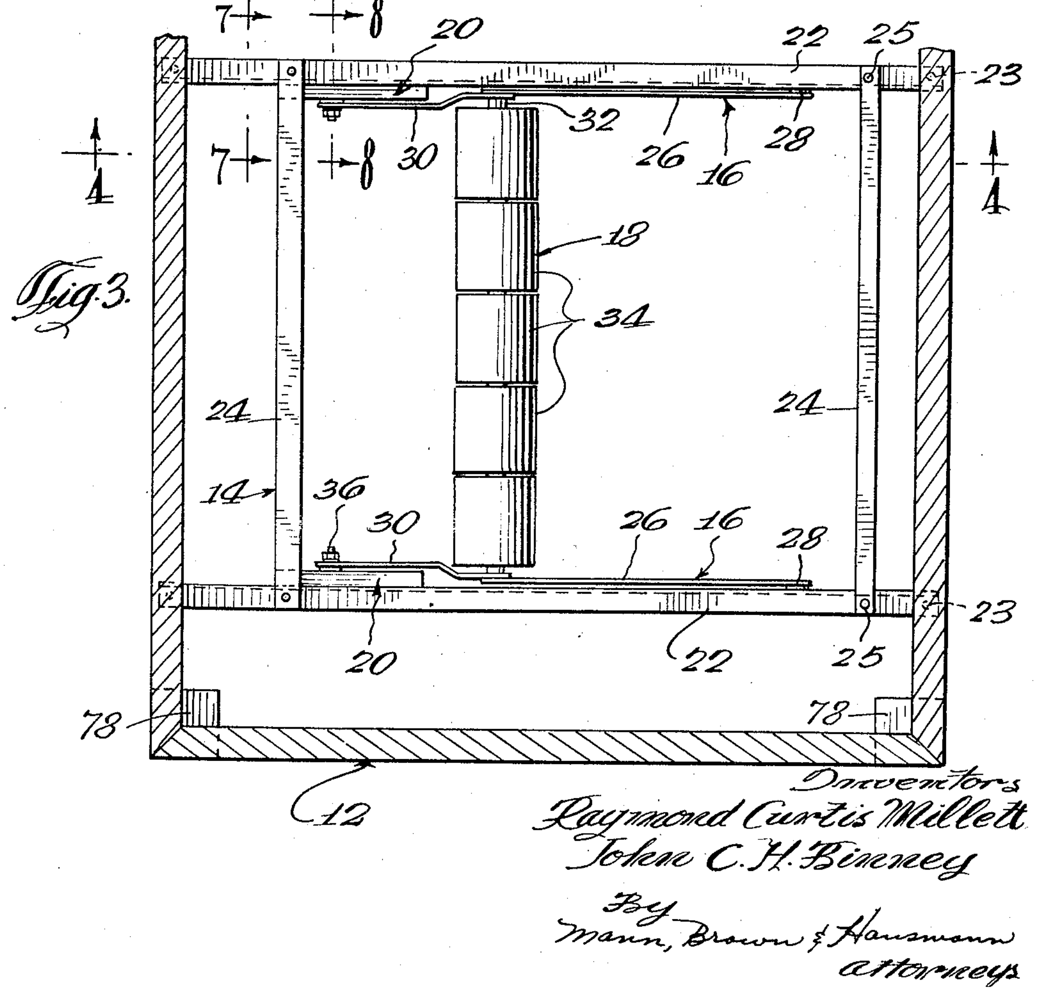
Figure 3 is a sectional view along line 3—3 of Figure 1, illustrating the device comprising our invention on a larger scale.
Figure 4:
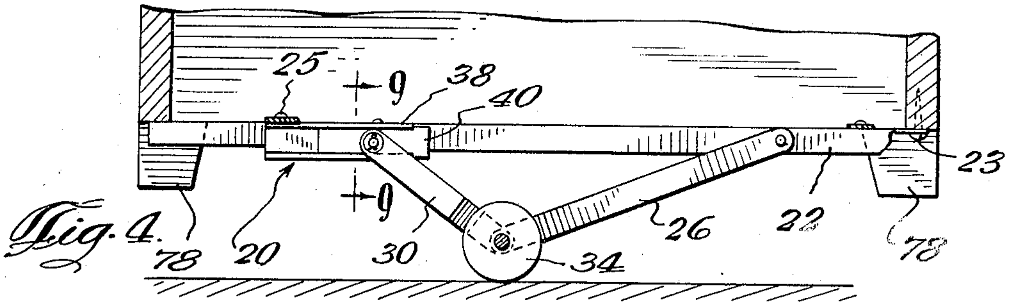
Figure 4 is a sectional view along line 4—4 of Figure 3.
Figure 11:
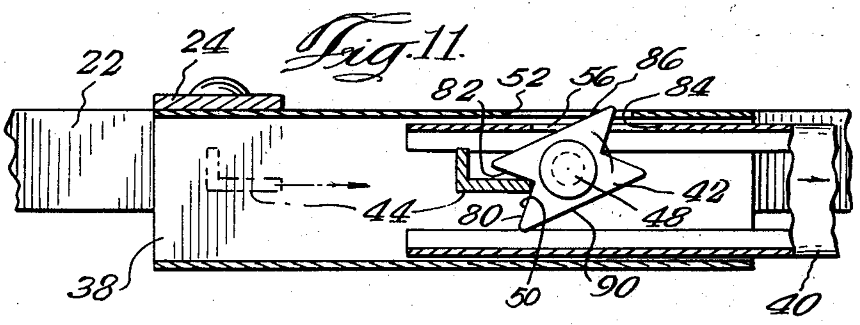
Figures 11–16 are sectional views of the releasable latching means, partially in elevation, illustrating the successive positions of the various elements comprising same when the roller means comprising the invention is employed to move a piece of furniture.
Figures 12, 13, 14, 15, 16, 17:
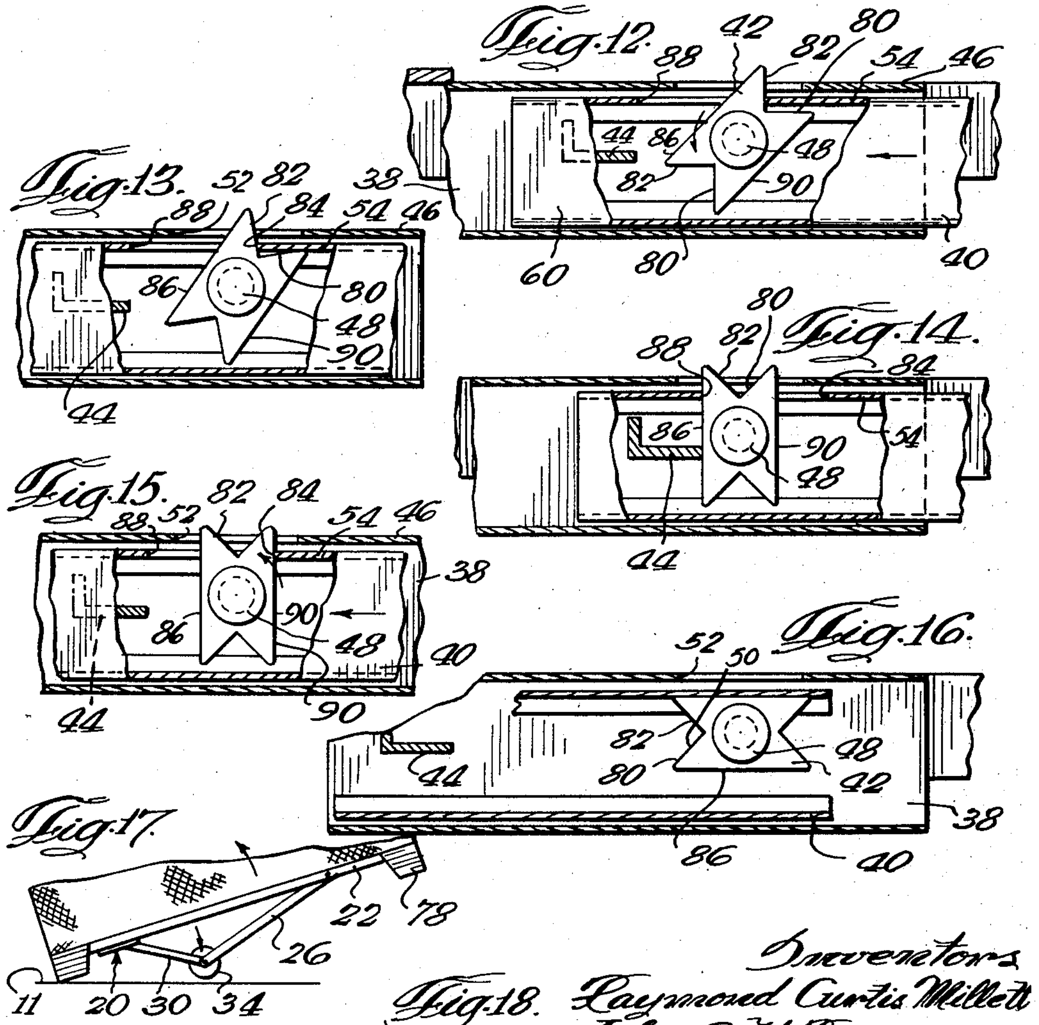
Figures 17 and 18 are views similar to Figures 1 and 2, illustrating the steps involved in rendering the roller device inoperative.

Assuming the frame 14 is secured between the legs 78 of chair 12, as shown in Figures 1 and 3, and therefore is secured to the bottom of the chair and adjacent the supporting surface 11 therefor, the operation of the device is as follows: Normally, the elements of the device are in the position shown in Figures 1, 3, and 16, wherein the pawl 42 extends longitudinally of the channel member 38 and the links or arms 26 and 30 of the pivoted arms 16 are substantially aligned, with the rollers 34 resting on the supporting surface 11 between said supporting surface and the bottom of the chair. One desiring to move the chair 12 merely lifts up one side of the chair and thereupon the inner channel member 40 moves outwardly of the channel member 38, in the direction of the arrows of Figure 11, due to the attraction of gravity on the rollers 34. The lug 44 carried by the channel member 40 eventually engages the lower side 80 of a V-shaped notch or recess 50 of pawl 42, and pivots the pawl until the upper side 82 of recess 50 engages the lug 44 as shown in Figure 11. At this point, the pawl 42 ceases to pivot as the upper side 82 of the recess 50 impinges against the lug 44; the outward movement, or the movement in the direction of the arrows of Figure 11 then ceases. The chair 12 is then lowered, whereupon the lug 44 moves away from, or to the left of the pawl as shown in Figure 11 to the position of Figure 12, the side 84 of slot 56 formed in channel member 40 engaging the side 82 of the other notch or recess 50 (the one to the right as shown in Figures 11 and 12). The channel member 40 is now moving inwardly of the channel member 38 and this movement ceases when the end of side 80 of said other recess 50 engages the inner surface of side 54 of channel member 40, as shown in Figure 13, thereby locking or latching the device. In this position, the weight of the chair may be supported on rollers 34, and the chair, after being tilted up on the rollers, may be easily moved to a new location by one person. It will be noted that links or arms 26 and 30 are at an angle to each other in this position, forming a truss arrangement for support of the chair 12 on rollers 34.

Figure 18:
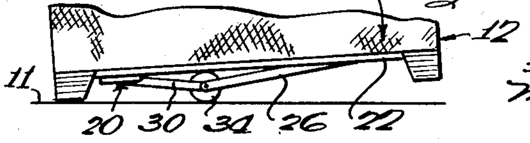

When the chair is in the position desired, one merely tilts one side of the chair upwardly until the weight of the chair is taken off the rollers, somewhat as shown in Figure 17; during this movement, the lug 44 engages a side 90 of pawl 42, pivoting it from the position shown in Figure 13 to the position shown in Figure 14, whereupon the side 86 of the pawl engages the end 88 of slot 56 and outward movement of the channel member 40 with respect to the channel member 38 ceases. One then merely lowers the chair to the ground as indicated in Figure 18, during which movement the side 84 of slot 56 engages the other side 90 of pawl 42, pivoting it from the position shown in Figure 15 to the position shown in Figure 16. When the chair again rests on its new supporting surface, the elements of the device 10 are in their original positions for operation in the above described manner when it is again desired to move the chair.

It will be noted that the pawl 42 when not substantially longitudinally disposed, as shown in Figure 16, extends through both the slots 52 and 56. Only slot 56 enters into the actual operation of the latch, however, and slot 52 need only be long enough to allow free movement of pawl 42.

We contemplate that the device 10 may be applied to a wide variety of objects or articles other than the chair 12, such as, for instance, other types of overstuffed furniture, chests, tables, portable laundry equipment, beds, pianos, desks, filing and other types of cabinets, safes, counters, tool chests, work benches, oil and the like drums, etc. For relatively long items such as davenports, we contemplate that two frames 10 may be employed, one at each end of the davenport, and the frames 14 may be modified to receive the end of a removable lifting lever to aid in lifting the end of the davenport. The device 10 illustrated, however, is made specifically for use on overstuffed chairs.

We also contemplate that the frame 14 could be eliminated and the pairs of pivoted links or arms 16 and channel members 38 secured directly to the item to which the device is attached. And furthermore, only one pair of pivoted links or arms 16, or more than two pairs, could be employed if so desired.

Figure 2:
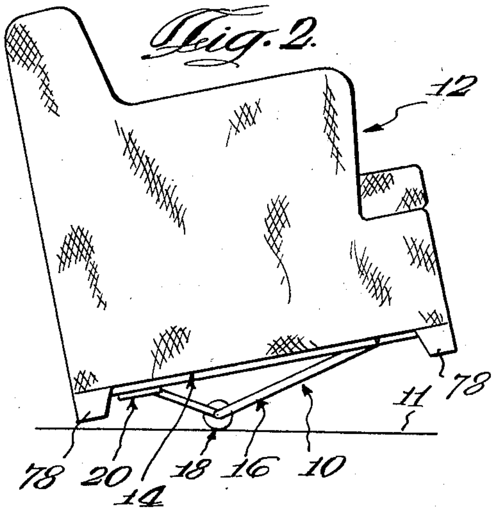
Figure 2 is similar to Figure 1, but shows the roller means of the present invention in operative position.

The various elements of the device may be formed out of any suitable materials, depending mainly on the weight which the device is to support when in operation, the surface over which the device will normally be rolled and other operating conditions. It will be appreciated that the device will operate in an inverted position from that illustrated in the drawings, that is, in a position wherein the slots 52 and 56 are below the pawl 42 and lug 44 rather than above, and we have found that any side of, for instance, the chair 12, may be lifted to operate the device; that is, the rear or the sides of the chair 12 could be lifted to operate the device 10 rather than the front as shown in Figures 1 and 2. Moreover, in special cases the article or object could be lifted straight up and the lowered back toward the supporting surface, rather than tilted, if this is desirable under the circumstances.

Figure 19:
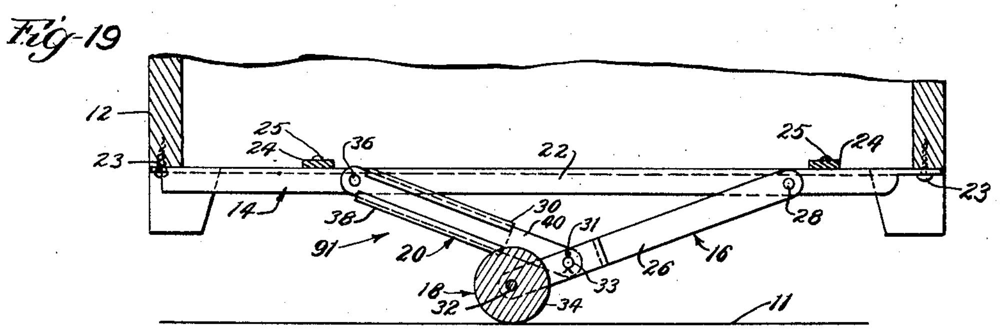
Figure 19 is a view similar to that of Figure 4, illustrating a modified form of the invention, and showing same in extended position.
Figure 20:
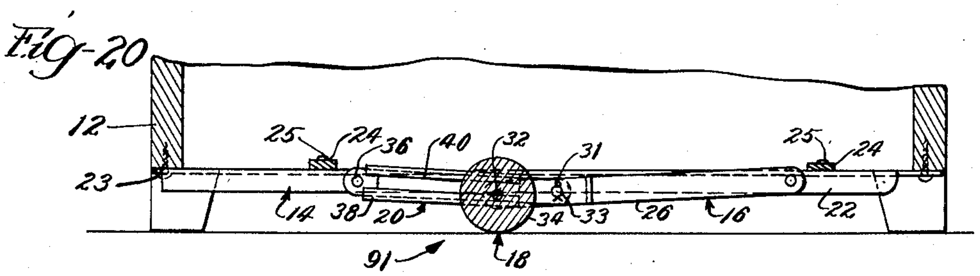
Figure 20 is a view similar to that of Figure 4, showing the modification of Figure 19 in retracted position.

Referring now to the embodiment of Figures 19 and 20, reference numeral 91 generally indicates a further form of the device applied to, for instance, an overstuffed chair 12 resting on a supporting surface 11. The device 91 as illustrated includes a frame 14, two pairs of pivoted links or arms 16 (only one pair is shown), roller means 18 and releasable latching or locking devices 20.

The device 91 is similar in nature to the device shown in Figures 1 through 18. However, in the device 91, the latching or locking devices 20 form one arm of each set of pivoted links or arms 16. As in the embodiment of Figures 1 through 18, the frame 14 comprises a pair of rigid angle bars 22 fixed in spaced relationship by a pair of bars 24 secured thereto, as by screws 25. The frame 14 may be secured to the bottom of a chair 12 in any suitable manner, as at the ends of the bars 22 by suitable screws, bolts or the like, as diagrammatically indicated in 23.

In the embodiment of Figures 19 and 20, each pair of pivoted links or arms 16 comprises a first link or arm 26 pivoted at one end thereof by a pin 28 to a frame bar 22 and a second link or arm 30 pivotally connected to the other end of said link or arm 26. In this embodiment of the invention, the arms 26 are pivoted to the respective arms 30 by pins 33, cotter pins 31, for instance, securing these pins 33 in place, and rod 32 is mounted in the extreme ends of arms 26. Rod 32 rotatably carries the plurality of segmented rollers 34, five in a preferred construction. The arms 30 of the embodiment of Figures 19 and 20 are pivotally connected by pins 36 to the frame bars 22. The releasable latching devices 20 are incorporated in arms 30, making them telescopic in nature.

The releasable latching devices 20 of the form of the invention shown in the Figures 19 and 20 are similar to the device illustrated in Figures 5 and 6. As described hereinbefore, the inner channel 40 of each device 20 is positioned within the channel 38 with the open side thereof adjacent the web 58 of the larger channel member, and the lug 44 is positioned to engage the pawl 42 when moved toward it.

The operation of these latching devices 20 is completely described hereinbefore and further description thereof is believed to be here unnecessary. In the device 91, the channels 38 are pivoted by pins 36 to the frame bars 22 and the channels 40 are pivoted to the respective links or arms 26 by the pins 33. It will thus be seen that links or arms 30 of the device are telescopic in nature and thus permit the necessary vertical movement of roller means 18.

One desiring to move the chair 12 merely lifts up on one side of the chair and thereupon the inner channel member 40 moves outwardly and downwardly of the channel member 38, due to the action of gravity on the rollers 34. The chair 12 is then lowered, thereby locking or latching the device 91 in the position of Figure 19. In this position, the seat of the chair may be supported on rollers 34 and the chair, after being tilted up on the rollers, may be easily moved to a new location by one person. It will be noted that links or arms 26 and 30 are at an angle to each other in this position, forming a truss arrangement for support of a chair 12 on rollers 34.

When the chair 12 is in the position desired, one merely tilts one side of the chair upwardly until the weight of the chair is taken off the rollers. As described above, this unlocks the latching devices 20 and one then merely lowers the chair to the ground. The elements of the latch device 20 are now in their original position for operation in the above described manner when it is again desired to move the chair.

As indicated above, we contemplate that the frame 14 could be eliminated and the pairs of pivoted links or arms 16 secured directly to the chair or other article to which the device is attached. And furthermore, only one pair of pivoted links or arms 16, or more than two pairs, could be employed in the device 91 if so desired. Moreover, the arms or links 26 and 30 of device 91 could be pivotally connected together by rod 32 in an alternate arrangement.

Figure 21:
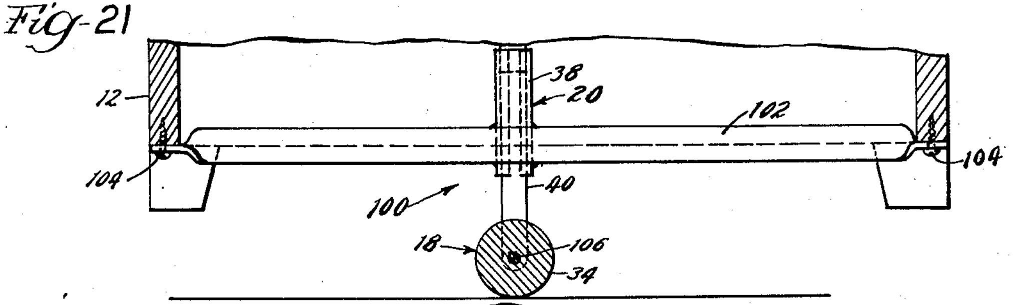
Figure 21 is a view similar to that of Figure 4, illustrating a further form of the invention.

Figure 21 illustrates a simplified form 100 of the invention in which the pivoted links or arms 16 are eliminated, and the latching devices 20 are alone employed. In the embodiment of Figure 21, an elongate bar 102 is fixed to each side of the chair 12 by screws 104 or the like. Each bar 102 has welded thereto the channel member 38 of a latching device 20. A rod 106 is mounted in the lower ends of channel members 40, and said rod 106 has rotatably mounted thereon roller means 18 comprising a plurality of rollers 34. The device 100 operates in the same manner as the forms of the inventions described above, Figure 21 showing the device in extended position.

Figure 22:
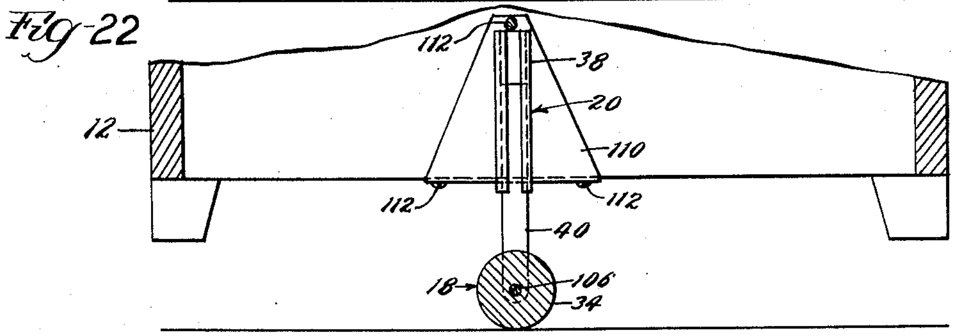
Figure 22 is a view similar to that of Figure 4, illustrating still a further form of the invention.

Figure 22 illustrates a modified form of the embodiment shown in Figure 21 wherein the latching devices 20 are secured to triangular shaped plates 110 fixed to the chair 12 by, for instance, screws 112. In this form of the invention, the channel members 38 are welded or otherwise fixed to the plates 110. The device 100 is otherwise similar in nature to that shown in Figure 21.

Figure 23:
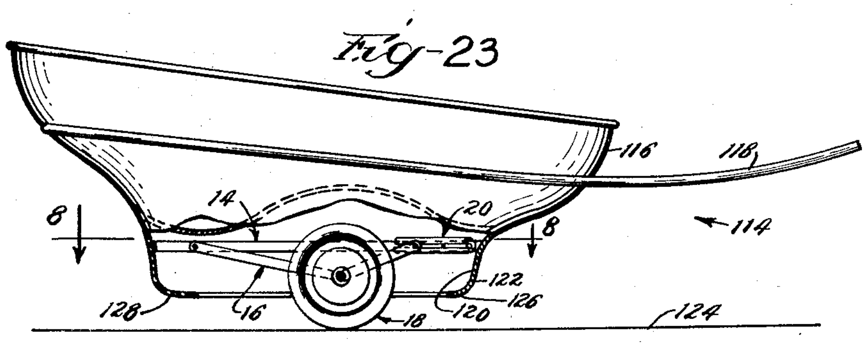
Figure 23 is a side elevational view, partially in section, illustrating an improved form of wheelbarrow having our invention applied thereto.
Figure 24:
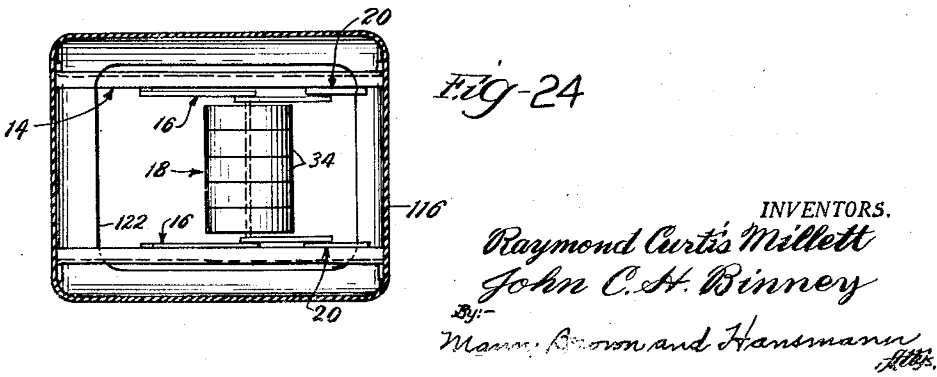
Figure 24 is a cross sectional view along line 24—24 of Figure 23.

Figures 23 and 24 illustrate an improved wheeled receptacle in the form of a wheelbarrow 114 in which our invention is incorporated. The wheelbarrow 114 includes receptacle body 116 having a pair of handles 118 (only one of which is shown) secured thereto and a recess 120 formed in the bottom thereof. As shown in Figure 23, the form of the invention shown in Figures 1–18 is secured to the receptacle body 116 within the recess 120, including frame 14, two pairs of pivoted links or arms 16, roller means 18, and releasable latching or locking devices 20. The downwardly depending portions of the receptacle body 116 forming the recess 120 provide a skirt 122.

In use, the wheelbarrow receptacle body 116 normally engages the supporting surface 124 when the wheelbarrow is at rest for loading purposes or the like. When the wheelbarrow has been filled, the operator applies his weight adjacent the ends of the handles 118 to tip the receptacle body about the portion 126 of skirt 122, whereupon the roller means 18 is brought to its extended position by the action of gravity. The operator thereupon tilts the receptacle up on the roller means, and moves the wheelbarrow to the desired destination. He then dumps the wheelbarrow, as by tilting the receptacle away from him about the portion 128 of skirt 122. Upon returning the wheelbarrow to the supporting surface 124, it will rest on its skirt 122 as the latching devices 20 will be released to allow the roller means 18 to be withdrawn to retracted position. When it is desired to move the wheelbarrow, the operator merely tilts it forwardly or rearwardly to extend the roller means 18 and lock the latching devices 20.

It will be appreciated that our improved wheelbarrow has a number of advantages. In the first place, the roller means 18 supports the entire load, and all the operator need do is hold the receptacle body 116 upon the roller means to preserve balance and push the wheelbarrow to its destination. In conventional wheelbarrows, the operator must also carry about one-third of the wheelbarrow load. Also, in starting a fully loaded wheelbarrow, the operator need only apply his weight downwardly on the handles, rather than lift upwardly as in conventional wheelbarrows, and then tilt the wheelbarrow up on the extended roller means. The relatively long roller means 18 eliminates the tendency of wheelbarrows to weave from side to side, thus eliminating the need for side to side balancing, while yet permitting the operator to easily direct the wheelbarrow where desired. The wheelbarrow 114 may be dumped with ease at the exact spot desired since the conventional wheelbarrow "nose," where the single wheel is ordinarily mounted in front of the receptable body, is eliminated. If the operator should inadvertently lose control of the wheelbarrow when it is fully loaded, the skirt 112 prevents tipping and will automatically stop forward movement.

Summarizing, our invention provides a retractable roller device that is operated by merely tilting to one side the article to which it is applied. As the releasable latching device employed includes elements that operate regardless of how the device is positioned, it is not necessary that the article be tilted in any certain way or direction to operate the invention. This is because the pawl or ratchet wheel 42 is mounted at its center of gravity, and the abutments or abutment means provided by lug 44 and sides of slot 56, which are fixed with respect to each other as they are secured to the same rigid member, cooperate in the same manner with pawl 42 in any possible position of same.

This application is a continuation-in-part of our copending application Serial No. 478,334, filed December 29, 1954, now abandoned.

The foregoing description and the drawings are given merely to explain and illustrate our invention, and the invention is not to be limited thereto, except insofar as the appended claims are so limited since those skilled in the art who have our disclosure before them will be able to make modifications and variations therein without departing from the scope of the invention.

We claim:

1. A roller device adapted to be applied to the bottom of an article adapted to rest on a supporting surface comprising a first pair of channel members, a second pair of channel members spaced a substantial distance from said first pair of channel members and extending generally parallel thereto, said pairs of channel members each comprising a first channel member, and a second channel member slidably received within said first channel member, said first channel members of said pairs of channel members being adapted to be secured to the article, vertically movable roller means operatively connected to and secured between said second channel members of said pairs of channel members, a pawl element carried by one of said channel members of each pair of channel members, a lug element carried by the other of said channel members of each pair of channel members, said lug element of each pair of channel members being positioned to engage said pawl element of the respective pairs of channel members on movement of one of said elements toward the other respectively, said one channel member of each pair of channel members having a slot formed therein adjacent said pawl element of the respective pairs of channel members, said other channel member of each pair of channel members having a slot formed in one side thereof which is adapted to be aligned with and positioned adjacent said first mentioned slot of said pairs of channel members, said roller means comprising a vertically movable rod-like element and a plurality of independently rotatable rollers threaded on said rod-like element, said pawl element, said lug element, and the slot defining portions of said channel members of each pair of channel members comprising releasable latch means for locking said roller means in a position to bear the weight of the article when same is tilted to one side thereof to lift said rollers off the supporting surface, and for releasing said roller means when the article is again tilted to one side thereof to lift said rollers off the supporting surface, thereby permitting the article to again rest on the supporting surface.

2. The device set forth in claim 1 including spaced pairs of pivoted links respectively adapted to be pivoted to the article, said roller means being secured to said links, and wherein one of said links of each pair of links is formed by said first and second pairs of channel members, respectively.

3. The device set forth in claim 1 wherein said pairs of channel members are vertically disposed, and said first channel members of said pairs of channel members are fixed to the article.

4. In a device of the type described, comprising a receptacle adapted to rest on a supporting surface having its bottom formed with a downwardly opening recess, handle means secured to said receptacle, a first pair of channel members, a second pair of channel members spaced a substantial distance from said first pair of channel members transversely of the receptacle, and extending generally parallel to said first pair, said pairs of channel members each comprising a first channel member and a second channel member slidably received within said first channel member, said first channel members of said pairs of channel members being secured to the receptacle within said recess, vertically movable roller means operatively connected to and secured between said second channel members of said pairs of channel members, a pawl element carried by one of said channel members of each pair of channel members, a lug element carried by the other of said channel members of each pair of channel members, said lug element of each pair of channel members being positioned to engage said pawl element of the respective pairs of channel members on movement of one of said elements toward the other, respectively, said one channel member of each pair of channel members having a slot formed therein adjacent said pawl element of the respective pairs of channel members, said other channel member of each pair of channel members having a slot formed in one side thereof which is adapted to be aligned with and positioned adjacent said first mentioned slot of said pairs of channel members, said roller means comprising a vertically movable rod-like element and a plurality of independently rotatable rollers threaded on said rod-like element, said pawl element, said lug element, and the slot defining portions of said channel members of each pair of channel members comprising releasable latch means for locking said roller means in a position to bear the weight of said receptacle when same is tilted to one side thereof to lift said rollers off the supporting surface, and for releasing said roller means when the article is again tilted to one side thereof to lift said rollers off the supporting surface, thereby permitting the receptacle to again rest on the supporting surface.

5. A retractable and projectible roller device adapted to be attached to the bottom of an article to facilitate movement of the article over a floor comprising an elongated inner member and an elongated outer member longitudinally slidably connected to each other at each side of the device, roller means transversely extending between the two outer members and operatively connected thereto, and latch means for holding the connected pair of members at each side of the device selectively in extended or retracted relation comprising a pawl mounted for free rotation on one of said pair of members and having its opposite ends inwardly notched and a slotted flange formed on the edge of the other member of said pair and a lug fixed to said other member between the edges thereof and opposite said slot, whereby when the article is tilted by lifting either end, the outer member of each pair drops to a partially projected position limited by engagement of the lug with one end notch of the pawl and the pawl is rotated by said engagement into a position with its opposite end projected through said slot, whereupon the outer member may be partially retracted by slightly lowering the article to withdraw the lug from engagement with the pawl and cause the lower margin of the slot to rotate the pawl to abut the notch with said margin and thereby hold the outer member in said partially retracted position with the roller means projected for rolling engagement with the floor, and whereby further lifting and lowering of the article will cause the pawl to be engaged successively by the lug and by the margin of the slot to rotate the pawl further to turn its first named end inwardly through the slot thereby freeing the outer member for movement to fully retracted position with the roller means withdrawn from engagement with the floor.

6. The combination claimed in claim 5 in which the roller means comprises a segmented roller extending substantially from the pair of members at one side of the device to the pair of members at the other side of the device.

7. The combination claimed in claim 5 in which the inner member of each slidably connected pair is of channel shape and has oppositely inwardly directed lips formed on each flange of the channel and enclosing the cooperating outer member of the pair.

8. The combination claimed in claim 5 in which the inner member of each slidably connected pair is of channel shape and has oppositely inwardly directed lips formed on each flange of the channel and the outer member of each pair is of channel shape enclosed within the channel shape of the inner member.

9. The combination claimed in claim 5 including an arm having one end portion pivotally connected to the outer end of each outer member and having its other end adapted to be pivotally connected to the bottom of the article.

10. The combination claimed in claim 5 including an arm having an outer end pivotally connected to the outer end of each outer member and having its other end adapted to be pivotally connected to the bottom of the article, and means connecting the outer ends of said arms supporting the roller means.

11. The combination claimed in claim 5 including an arm having an outer end portion pivotally connected to the outer end of each outer member and having its other end adapted to be pivotally connected to the bottom of the article, and a member connecting the outer ends of the two arms beyond their first named pivotal connections and mounting the roller means.

12. The retractable and projectible roller device claimed in claim 5, in combination with an article comprising a wheelbarrow type vehicle having a body and including a recess in the under side of the body, said slidably connected pair of inner and outer members being mounted at each opposite side of the body for movement of said roller means into and out of said recess.

13. The retractable and projectible roller device claimed in claim 5, in combination with an article comprising a wheelbarrow type vehicle having a body and including a lower skirt depending from said body defining a recess in the under side of the body and having front and rear bottom surfaces, said slidably connected pair of inner and outer members being mounted at each opposite side of the body for movement of said roller means into and out of said recess when the body is tilted to bring said front or rear bottom surface into engagement with the floor.

14. A roller device for furniture and the like adapted to be applied to the bottom of the furniture or the like comprising a first arm adapted to be pivotally secured at one end thereof to the furniture or the like, a second arm pivoted at one end thereof to the other end of said first arm, a first channel member adapted to be fixed to the furniture or the like, a second channel member slidably received within said first channel member, said second arm being pivotally secured at the other end thereof to said second channel member, roller means carried by said arms, a pawl carried by said first channel member, a lug carried by said second channel member, said lug being positioned to engage said pawl on movement of said lug toward said pawl, said first channel member having a slot formed therein above said pawl, said second channel member having a slot formed in one side thereof which is adapted to be aligned with and positioned adjacent said first mentioned slot, said pawl, said lug and the slot defining portions of said channel members comprising releasable latch means for locking said roller means in a position to bear the weight of the furniture or the like when same is tilted to one side, and for releasing said roller means when the furniture or the like is again tilted, thereby permitting the furniture to again rest on the supporting surface.

15. A roller device for furniture and the like adapted to be applied to the bottom of the furniture or the like adjacent the supporting surface thereof comprising a first arm adapted to be pivotally secured at one end thereof to the furniture or the like, a second arm pivoted at one end thereof to the other end of first arm, a first channel member adapted to be fixed to the furniture or the like, a second channel member slidably received within said first channel member, said second arm being pivotally secured at the other end thereof to said second channel member, roller means carried by said arms, an oblong pawl pivotally secured to said first channel member, said first channel member having a slot formed in one side thereof, and positioned with respect thereto to allow one of the two extremities of the pawl to extend outwardly of the side when the pawl is positioned transversely of said first channel member, a lug fixed to said second channel member, said lug being positioned to engage said pawl at a point between the pivotal point of the pawl and the other side of the first channel member, said second channel member having a slot formed in one side thereof and adapted to be aligned with the first mentioned slot, one of said extremities of said pawl extending outwardly of said one side of said second channel member and through the second mentioned slot when the pawl is positioned transversely of the first channel member, said extremities of said pawl each being formed with a V-shaped recess, said pawl normally extending longitudinally of said first channel member, whereby when the furniture or the like is moved upwardly from the supporting surface, the weight of said roller means causes said arms to pivot about their pivotally connected ends and said second channel member to slide with respect to said first channel member thereby bringing said lug into engagement with one of the V-shaped recess defining extremities of said pawl thereby pivoting said pawl into a position wherein one side of the other V-shaped recess defining extremities extends through both of said slots and the other side of said other V-shaped recess defining extremities remains within the second channel member, and as the furniture or the like is lowered toward the supporting surface, one end of the slot of the second channel member moves toward and the portion of said second channel member defining said end engages said one side of said other V-shaped recess defining extremities thereby pivoting said pawl toward a more transverse position, and said other side thereof engages said one side of the second channel member to preclude further pivotal movement of said pawl whereupon the furniture is supported on the roller means, and when the furniture or the like is again moved upwardly from the supporting surface to take the weight of the furniture or the like off said roller means, said lug again engages said pawl to position said pawl substantially transversely of said first channel member, said portion of said second channel member which defines said one end of said slot engaging said pawl to move said pawl into its original position upon the furniture being lowered toward the supporting surface, thereby releasing said roller means from locked position and allowing the furniture or the like to again engage the supporting surface.

References Cited in the file of this patent

UNITED STATES PATENTS

| | | |
|---|---|---|
| 165,217 | Dockstader | July 6, 1875 |
| 169,097 | Garretson | Oct. 26, 1875 |
| 795,592 | Edick | July 25, 1905 |
| 855,835 | Clayton | June 4, 1907 |
| 894,949 | Hendricks | Aug. 4, 1908 |
| 1,383,381 | Borst | July 5, 1921 |
| 1,482,527 | Simpson | Feb. 5, 1924 |
| 2,229,513 | Lustig | Jan. 21, 1941 |
| 2,253,161 | Atwood | Aug. 19, 1941 |
| 2,490,953 | Eriksen | Dec. 13, 1949 |
| 2,531,857 | Martini | Nov. 28, 1950 |

OTHER REFERENCES

Popular Mechanics, February 1952, page 223.